United States Patent
Wang et al.

(10) Patent No.: US 10,351,725 B2
(45) Date of Patent: Jul. 16, 2019

(54) STABLE COATING COMPOSITION

(71) Applicants: Dow Global Technologies LLC, Midland, MI (US); Rohm and Haas Company, Philadelphia, PA (US)

(72) Inventors: Rui Wang, Shanghai (CN); Ling Li, Shanghai (CN); Junyu Chen, Shanghai (CN); Tao Wang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 27 days.

(21) Appl. No.: 15/318,387

(22) PCT Filed: Jul. 8, 2014

(86) PCT No.: PCT/CN2014/081809
§ 371 (c)(1),
(2) Date: Dec. 13, 2016

(87) PCT Pub. No.: WO2016/004575
PCT Pub. Date: Jan. 14, 2016

(65) Prior Publication Data
US 2017/0121553 A1 May 4, 2017

(51) Int. Cl.
*C09D 133/12* (2006.01)
*C08F 230/02* (2006.01)
*C09D 143/02* (2006.01)
*C08F 220/18* (2006.01)
*C09D 7/65* (2018.01)

(52) U.S. Cl.
CPC .......... *C09D 133/12* (2013.01); *C08F 220/18* (2013.01); *C08F 230/02* (2013.01); *C09D 7/65* (2018.01); *C09D 143/02* (2013.01)

(58) Field of Classification Search
CPC .................. C09D 133/12; C09D 7/12
USPC ........................................... 524/521
See application file for complete search history.

(56) References Cited

U.S. PATENT DOCUMENTS

| | | | |
|---|---|---|---|
| 6,221,145 B1 | 4/2001 | McClain | |
| 8,043,476 B2 | 10/2011 | Haigh et al. | |
| 9,029,465 B2 | 5/2015 | Bohling et al. | |
| 2008/0146724 A1 | 6/2008 | Bohling et al. | |

FOREIGN PATENT DOCUMENTS

| | | | |
|---|---|---|---|
| CA | 2363656 A1 | 5/2002 | |
| EP | 1273636 A2 | 1/2003 | |
| EP | 1932862 A1 | 6/2008 | |
| WO | 2003037984 A1 | 5/2003 | |
| WO | 2009088792 A1 | 7/2009 | |
| WO | WO2013016402 | * | 1/2013 |

OTHER PUBLICATIONS

International Search Report for International Application No. PCT/CN2014/081809; International Filing Date Jul. 8, 2014; dated Jan. 26, 2015; 3 pages.
Written Opinion of the International Search Report for International Application No. PCT/CN2014/081809; International Filing Date Jul. 8, 2014; dated Jan. 26, 2015; 4 pages.

* cited by examiner

*Primary Examiner* — Deve E Valdez
(74) *Attorney, Agent, or Firm* — Karl E. Stauss; Cantor Colburn LLP

(57) ABSTRACT

A coating composition comprising from 8% to 40% of a polymer; and from 0.1% to 3% of a dispersant. The polymer comprises a first acrylic monomer and from 0.2% to 5% of a first phosphorus-containing monomer. The dispersant comprises a second acrylic monomer and more than 20% of a second phosphorus-containing monomer.

12 Claims, No Drawings

STABLE COATING COMPOSITION

FIELD OF THE INVENTION

The present invention relates to a stable coating composition comprising a phosphorus-containing polymer dispersion. In particular, the phosphorus-containing polymer dispersion comprises a phosphorus-containing monomer of equal to or higher than 1 weight percent of the phosphorus-containing polymer dispersion.

INTRODUCTION

Benefits of phosphorus-containing monomers such as phosphoethyl methacrylate (PEM) have long been recognized in the coating industry. Coatings comprising polymer dispersions polymerized from such phosphorus-containing monomers have dramatically improved coating performances such as scrub resistance, stain resistance, corrosion resistance and durability. However, research has also shown that the concentration of phosphorus-containing monomers in a coating is often inversely correlated to coating viscosity stability.

It is therefore desired in the coating industry to have a coating composition comprising a phosphorus-containing polymer dispersion at a higher concentration (with phosphorus-containing monomer equal to or higher than 1 weight percent of the phosphorus-containing polymer). The new coating composition should have both satisfactory coating viscosity stability and improved coating performances such as scrub resistance, stain resistance, corrosion resistance and durability.

SUMMARY OF THE INVENTION

The present invention provides a coating composition comprising by dry weight based on total dry weight of the coating composition, from 8% to 40% of a polymer, and from 0.1% to 3% of a dispersant. The polymer comprises a first acrylic monomer, and by dry weight based on total dry weight of the polymer, from 0.2% to 5% of a first phosphorus-containing monomer. The dispersant comprises a second acrylic monomer, and by dry weight based on total dry weight of the dispersant, more than 20% of a second phosphorus-containing monomer.

DETAILED DESCRIPTION OF THE INVENTION

The present invention provides a coating composition comprising by dry weight based on total dry weight of the coating composition, from 8% to 40%, preferably from 10% to 30%, and more preferably from 15% to 25%, of a polymer; and from 0.1% to 3%, preferably from 0.3% to 2%, and more preferably from 0.6% to 1%, of a dispersant.

The polymer of the present invention comprises by dry weight based on total dry weight of the polymer, from 0.2% to 5%, preferably from 0.5% to 4%, and more preferably from 1% to 3%, of a first phosphorus-containing monomer; and a first acrylic monomer.

The dispersant of the present invention comprises by dry weight based on total dry weight of the dispersant, more than 20%, preferably less than 50%, and more preferably from 25% to 45%, of a second phosphorus-containing monomer; and a second acrylic monomer.

The dispersant has a weight average molecular weight of less than 15000, and preferably less than 8000. Any well-known molecular weight measurements in the art can be used to measure the weight average molecular weight. Gel Permeation Chromatography method is a commonly used measurement that is preferably used in the measurement of the weight average molecular weight of the dispersant.

The first and the second phosphorus-containing monomers can be the same or different. The first and the second acrylic monomers can also be the same or different.

The Acrylic Monomers

Suitable examples of the acrylic monomers include acrylates and methacrylates such as methyl methacrylate, ethyl methacrylate, ethyl acrylate, butyl acrylate, butyl methacrylate, and ethyl hexyl acrylate and combinations thereof. Preferred combinations of the acrylic monomers include methyl methacrylate and one or more monomers selected from ethyl acrylate, butyl acrylate, and 2-ethylhexyl acrylate. More preferred combinations of the acrylic monomers include methyl methacrylate and butyl acrylate; methyl methacrylate and ethylhexyl acrylate; and methyl methacrylate, butyl acrylate, and ethyl acrylate.

The polymer of the present invention may further include less than 10%, preferably less than 5%, and more preferably less than 2.5% by dry weight based on total dry weight of the polymer, of additional monomers. Suitable examples of the additional monomers include carboxylic acid functional monomers such as acrylic acid, methacrylic acid, maleic, fumaric and itaconic acid; sulfur acid functional monomers, including sulfoethyl (meth)acrylate, sulfopropyl (meth)acrylate, styrene sulfonic acid, vinyl sulfonic acid, and 2-(meth)acrylamido-2-methyl propanesulfonic acid, and salts thereof; vinyl esters such as vinyl acetate; and multifunctional monomers such as ureido methacrylate and acetoacetoxyethyl methacrylate.

The Phosphorus-Containing Monomers

The phosphorus-containing monomers comprise dihydrogen phosphate esters of an alcohol in which the alcohol contains or is substituted with a polymerizable vinyl or olefinic group. Suitable examples of the phosphorus-containing monomers include phosphoalkyl (meth)acrylates such as phosphoethyl (meth)acrylate, phosphopropyl (meth)acrylate, phosphobutyl (meth)acrylate, salts thereof, and any combination thereof; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and any combination thereof. Other suitable examples of the phosphorus-containing monomers are phosphonate functional monomers including vinyl phosphonic acid, allyl phosphonic acid, 2-acrylamido-2-methylpropanephosphonic acid, α-phosphonostyrene, 2-methylacrylamido-2-methylpropanephosphonic acid, and any combination thereof. The phosphorous-containing monomers preferably are selected from mono- or di-ester of phosphoalkyl (meth)acrylates, more preferably are mono- or di-ester of phosphoethyl methacrylate, and most preferably are phosphoethyl methacrylate (PEM).

The coating composition of the present invention is prepared by combining the polymer dispersion, the dispersant with other coating formulation materials including thickeners and any of a number of ancillary materials including extenders; pigments, including encapsulated or partially encapsulated pigments and opaque pigment particles; surfactants; defoamers; preservatives; flow agents; leveling agents; and neutralizing agents.

The coating composition of the present invention has a PVC of from 10% to 75%, and preferably from 20% to 70%.

PVC (pigment volume concentration) of the coating composition is calculated as follows, PVC (%)=[volume of pigment(s)+volume of extender(s)]/total dry volume of coating.

EXAMPLES

I. Raw materials

A) Monomers

| Abbreviation | Chemical nature |
|---|---|
| BMA | butyl methacrylate |
| MAA | methacrylic acid |
| PEM | phosphoethyl methacrylate |
| IAA | isoascorbic acid |

B) Commercially available materials

| Material | Available from |
|---|---|
| 3-Methylmercaptopropanal (MMP) | The Dow Chemical Company |
| NATROSOL ™ 250 HBR thickener | Ashland Aqualon Company |
| Propylene glycol | Sinopharm Chemical Reagent Co., Ltd. |
| AMP-95 ™ base | The Dow Chemical Company |
| OROTAN ™ 1288 dispersant | The Dow Chemical Company |
| OROTAN ™ 731A dispersant | The Dow Chemical Company |
| FOAMASTER ™ NXZ defoamer | Cognis Corporation |
| R-996 titanium dioxide pigment pigment | Sichuan Lomon Corporation |
| CC-700 calcium carbonate extender | Guangfu Building Materials Group |
| Talc-800 extender | BASF Company |
| DB-80 calcined kaolin extender | Shanxi Jinyang Calcined Kaolin Ltd. |
| ROPAQUE ™ Ultra E opaque polymer | The Dow Chemical Company |
| DISPONIL ™ FES 993 emulsifier | Cognis Corporation |
| TEXANOL ™ ester alcohol | Eastman Chemical Company |
| Sodium persulfate | Sinopharm Chemical Reagent Co., Ltd. |
| Ferrous sulfate (FeSO$_4$•7H$_2$O) | Sinopharm Chemical Reagent Co., Ltd. |
| tert-Butylhydroperoxide (t-BHP) | The Dow Chemical Company |
| Hydrogen peroxide (H$_2$O$_2$) | Sinopharm Chemical Reagent Co., Ltd. |
| Sodium acetate | Sinopharm Chemical Reagent Co., Ltd. |
| KATHON ™ LX biocide | The Dow Chemical Company |

II. Test Process

1. Viscosity Stability

A Stormer viscometer is used to test the viscosity of a coating composition according to the ASTM (American Society for Testing and Materials) D562 method. After the coating composition is formed, an initial medium shear viscosity, Initial KU, of the coating composition is tested at room temperature, and then the coating composition is placed in an oven at 50° C. for 6 days. The viscosity of the coating composition after storage is tested and recorded as Final KU. The difference between Initial KU and Final KU is defined as the heat-age viscosity change, ΔKU. The smaller the ΔKU value is, the better the viscosity stability is.

2. Opacity (Contrast Ratio)

Opacity is a contrast ratio, that is, a ratio of the reflectance of a dry coating film over a black substrate of 2% or less reflectance to the reflectance of the same coating, equivalently applied and dried, over a white substrate of 80% reflectance (ASTM D-2805.88).

III. Experimental Examples

1. Preparation of Dispersants with Different Phosphoethyl Methacrylate (PEM) Amounts A monomer emulsion was prepared by mixing 386 g deionized water, 33.33 g (31% active) surfactant, 650 g butyl methacrylate, 150 g methacrylic acid, different amounts of phosphoethyl methacrylate (PEM), and 25.5 g 3-methylmercaptopropanal (MMP).

The reactor was a 5-liter four-neck round-bottom flask equipped with a paddle stirrer, a thermometer, a nitrogen inlet, and a reflux condenser. 706 g of deionized water and 33.33 g (31% active) surfactant were added to the flask. The contents of the flask were heated to 85° C. under a nitrogen atmosphere and stirring. 43 g of the monomer emulsion was then added, quickly followed by a solution of 8 g sodium persulfate dissolved in 30 g deionized water, and a rinse of 5 g of deionized water. After stirring for 10 minutes, the remainder of the monomer emulsion, followed by a 30 g rinse, was added linearly over 120 minutes. An initiator and a buffer solution of 4.5 g sodium persulfate and 3.09 g sodium acetate dissolved in 180 g deionized water were started concurrent with the monomer emulsion feed and added linearly over a period of 125 minutes. When all additions were complete, the flask was diluted with 40 g deionized water and then cooled to 65° C. Three catalyst/activator pairs were added to the flask followed by promoter to reduce residual monomer. Then the flask was cooled to 40° C., a biocide solution of 5.59 g KATHON LX biocide (1.5% active) in 20 g deionized water was added over 10 minutes. After completion of the polymerization, the copolymer emulsion was cooled to ambient temperature and filtrated through a 325 mesh size screen. Phosphoethyl methacrylate (PEM) amounts in different dispersants are different and are listed in Table 2. The dispersant used in Coating composition 1 did not comprise PEM.

2. Preparation of the Coating Compositions 1 to 8

Coatings were prepared according to the formulation processes as shown in Table 1 by mixing the prepared dispersants with a polymer A or a polymer B. Polymer A comprises 1.0% by weight of the first phosphorus-containing monomer, while polymer B comprises 2.3% by weight of the first phosphorus-containing monomer. Other monomers in both polymer A and B are the same and are butyl acrylate, methyl methacrylate and methacrylic acid. After the Coating Composition is formed, each dispersant sample is post-added to the coating under stirring. AMP-95 base is also added to adjust the coating pH value.

TABLE 1

| Coating formulation | |
|---|---|
| "Grind" | |
| Water | 245.00 |
| NATROSOL 250 HBR thickener | 6.00 |
| AMP-95 base | 1.00 |
| OROTAN™ 1288 dispersant | 4.00 |
| FOAMASTER NXZ defoamer | 1.50 |
| R-996 titanium dioxide pigment pigment | 160.00 |
| DB-80 calcined kaolin extender | 110.00 |
| Talc-800 extender | 100.00 |
| CC-700 calcium carbonate extender | 70.00 |
| Sub totals | 697.50 |
| "Let-down" | |
| Water | 80.00 |
| Propylene glycol | 10.00 |
| ROPAQUE Ultra E opaque polymer | 10.00 |
| Polymer A or Polymer B | 170.00 |
| FOAMASTER NXZ defoamer | 2.00 |

TABLE 1-continued

| Coating formulation | |
|---|---|
| TEXANOL ester alcohol | 5.00 |
| Water | 25.50 |
| Total | 1000.00 |

IV. Results

TABLE 2[#]

| Coatings | phosphorus-containing monomer (%) based on dispersant | based on polymer | dispersant (%) based on coating | ΔKU | opacity |
|---|---|---|---|---|---|
| 1* | — | 1.0% | 0.46% | 27.1 | 96.34% |
| 2 | 25% | 1.0% | 0.46% | 18.0 | 96.06% |
| 3* | 10% | 1.0% | 0.23% | 30.1 | 96.35% |
| 4 | 25% | 1.0% | 0.23% | 22.5 | 95.78% |
| 5 | 25% | 1.0% | 0.12% | 25.7 | 95.82% |
| 6 | 20% | 2.3% | 0.23% | 38.5 | 96.00% |
| 7 | 20% | 2.3% | 0.46% | 23.6 | 95.67% |
| 8 | 25% | 2.3% | 0.46% | 18.5 | 95.79% |

[#]Each of the above coating compositions comprises 16.8% by dry weight based on total dry weight of the coating composition, of polymer A or polymer B
*Coatings 1 and 3 are Comparative Coating Examples Coatings 1 to 5 comprised polymer A, while Coatings 6 to 8 comprised polymer B. Coatings 1 to 8 further comprised the dispersants made according to the above method, and Coating 1 dispersant comprised no PEM, while Coatings 2 to 8 dispersants comprised different amounts of PEM as shown in Table 2. Coating 2 compared to Comparative Coating 1, showed improved viscosity stability, with ΔKU value decreased from 27.1 to 18.0. This indicated that PEM in the dispersant played a critical role in improving the viscosity stability of the coating composition made thereof. Coating 4 compared to Comparative Coating 3, also showed improved viscosity stability, with ΔKU value decreased from 30.1 to 22.5. This indicated that in a reasonably range, the higher the amount of PEM in the dispersant, the more contributions it made. Coating 5 was an example with a relatively lower dispersant amount, while the viscosity stability of the coating composition is still acceptable. Coating 7 compared to Coating 6, also showed improved viscosity stability, with ΔKU value decreased from 38.5 to 23.6. This indicated that even with the same PEM amount in the dispersants, higher dispersant amounts in the coating composition leaded to better viscosity stability, therefore, dispersant amount played also a critical role in the viscosity stability of the coating composition made thereof. Coating 8 compared to Coating 7, also showed improved viscosity stability, with ΔKU value decreased from 23.6 to 18.5. This indicated that in a reasonably range, the higher the amount of PEM in the dispersant, the more contributions it made.

The results also showed that with improved viscosity stabilities, the opacities of the coating compositions did not change much and were kept well.

It should be noticed that with different polymer amounts in the coating composition, to achieve similar viscosity stability of the coating compositions, required PEM amounts in the dispersants and required dispersant amounts in the coating composition differed. The suitable amounts of each component in the coating compositions should therefore not be limited by examples, while could be modified by people in the art through well-known techniques.

What is claimed is:

1. A coating composition comprising by dry weight based on total dry weight of the coating composition, from 8% to 40% of a polymer; and from 0.1% to 3% of a dispersant; wherein the polymer comprises a first acrylic monomer, and by dry weight based on total dry weight of the polymer, from 0.2% to 5% of a first phosphorus-containing monomer; and the dispersant comprises a second acrylic monomer, and by dry weight based on total dry weight of the dispersant, more than 20% of a second phosphorus-containing monomer,
    wherein the second phosphorus-containing monomer is phosphoethyl methacrylate.

2. The coating composition of claim 1 wherein the dispersant has a weight average molecular weight of less than 15000.

3. The coating composition of claim 1 wherein the first phosphorus-containing monomer is selected from mono- or di-ester of phosphoalkyl (meth)acrylates.

4. The coating composition of claim 3 wherein the first phosphorus-containing monomer is phosphoethyl methacrylate.

5. The coating composition of claim 1 wherein at least one of the first and the second acrylic monomers comprises methyl methacrylate.

6. The coating composition of claim 5 wherein at least one of the first and the second acrylic monomers further comprises monomers selected from ethyl acrylate, butyl acrylate, 2-ethylhexyl acrylate, and any combination thereof.

7. The coating composition of claim 1 wherein the polymer further comprises additional monomers selected from carboxylic acid functional monomers, sulfur acid functional monomers, vinyl esters, multifunctional monomers, and any combination thereof.

8. The coating composition of claim 7 wherein the multifunctional monomers are selected from ureido methacrylate, acetoacetoxyethyl methacrylate, and any combination thereof.

9. A coating composition comprising a polymer comprising a first phosphorus-containing monomer and a first acrylic monomer; a dispersant comprising a second phosphorus-containing monomer and a second acrylic monomer; wherein the second phosphorus-containing monomers is phosphoethyl methacrylate; and at least one of the first and the second acrylic monomers comprises methyl methacrylate,
    wherein the composition comprises by dry weight based on total dry weight of the coating composition, from 15% to 25% of the polymer, and from 0.6% to 1% of the dispersant; and the polymer comprises from 1% to 3%, by dry weight based on total dry weight of the polymer, of the first phosphorus-containing monomer; and the dispersant comprises from 25% to 45%, by dry weight based on total dry weight of the dispersant, of the second phosphorus-containing monomer, and
    wherein the coating composition provides improved viscosity stability compared to a composition not containing the second phosphorous-containing monomer.

10. The coating composition of claim 1, wherein the coating composition provides improved viscosity stability compared to a composition not containing the second phosphorous-containing monomer.

11. The coating composition of claim 1, wherein the dispersant comprises, by dry weight based on total dry weight of the dispersant, 20% to 25% of the second phosphorus-containing monomer.

12. The coating composition of claim 1, wherein the coating composition comprises 0.1 to 0.46% of the dispersant.

\* \* \* \* \*